United States Patent
Chen et al.

(10) Patent No.: US 10,467,881 B2
(45) Date of Patent: Nov. 5, 2019

(54) HYDRAULIC ACCUMULATOR HEALTH MONITORING AND REMAINING LIFE SYSTEM

(71) Applicant: Caterpillar Inc., Peoria, IL (US)

(72) Inventors: Dayao Chen, Bolinkgbrook, IL (US); Aleksandar Egelja, Naperville, IL (US); Kalpeshkumar N. Patel, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/877,664

(22) Filed: Jan. 23, 2018

(65) Prior Publication Data

US 2019/0228637 A1  Jul. 25, 2019

(51) Int. Cl.

| | |
|---|---|
| *G01F 1/36* | (2006.01) |
| *G08B 21/18* | (2006.01) |
| *G01K 13/02* | (2006.01) |
| *G01L 19/12* | (2006.01) |
| *G01L 19/00* | (2006.01) |
| *F15B 20/00* | (2006.01) |

(Continued)

(52) U.S. Cl.
CPC .......... *G08B 21/187* (2013.01); *F15B 20/005* (2013.01); *G01F 1/36* (2013.01); *G01K 13/02* (2013.01); *G01L 19/0092* (2013.01); *G01L 19/12* (2013.01); *F15B 19/005* (2013.01); *G01M 15/00* (2013.01); *G01M 15/08* (2013.01)

(58) Field of Classification Search
CPC ...... F15B 15/00; F15B 19/005; F15B 20/005; F15B 2201/00; F15B 2201/31; F15B 2201/312; F15B 2201/50; F15B 2201/51; F15B 2201/515; G01F 1/36; G01M 15/00; G01M 15/05; G01M 15/06; G01M 15/08; G05B 19/048; G05B 23/0283
See application file for complete search history.

(56) References Cited

U.S. PATENT DOCUMENTS

| 4,129,037 A | 12/1978 | Toalson |
| 6,817,252 B2 | 11/2004 | Wiklund et al. |

(Continued)

OTHER PUBLICATIONS

Dr. Leo Caspers, et al. "From Reliable Sensors to Cylinder Intelligence" Publication Year: 2016.

*Primary Examiner* — Benyam Haile
(74) *Attorney, Agent, or Firm* — Miller, Matthias & Hull

(57) ABSTRACT

A monitoring system includes a hydraulic accumulator including a piston movably disposed therein. At least one seal encompasses the piston. A first pressure sensor is configured to monitor pressure of a first fluid in a first chamber. A second pressure sensor is configured to monitor pressure of a second fluid in a second chamber. A first temperature sensor is disposed in the first chamber and configured to monitor the temperature of the first fluid. A second temperature sensor is disposed in the second chamber and configured to monitor the temperature of the second fluid. An electronic control unit is in communication with the sensors and programmed to in response to receiving pressure signals from the pressure sensors and temperature signals from the temperature sensors, determine a wear volume of the at least one seal; and compare the wear volume of the at least one seal to a predetermined threshold wear volume of the at least one seal to determine the remaining useful life of the hydraulic accumulator.

18 Claims, 4 Drawing Sheets

(51) Int. Cl.
  *F15B 19/00*  (2006.01)
  *G01M 15/00*  (2006.01)
  *G01M 15/08*  (2006.01)

(56) References Cited

U.S. PATENT DOCUMENTS

| | | | | |
|---|---|---|---|---|
| 7,120,523 | B2* | 10/2006 | Muller | F15B 15/14 |
| | | | | 701/31.4 |
| 9,459,609 | B2 | 10/2016 | Koizumi et al. | |
| 2012/0084019 | A1* | 4/2012 | Khonsari | C22C 38/00 |
| | | | | 702/35 |
| 2014/0076061 | A1* | 3/2014 | Anderson | F16K 5/0663 |
| | | | | 73/843 |
| 2018/0161790 | A1* | 6/2018 | Jin | B05C 5/02 |

* cited by examiner

HYDRAULIC ACCUMULATOR HEALTH MONITORING AND REMAINING LIFE SYSTEM

TECHNICAL FIELD

The present disclosure relates generally to hydraulic accumulators and, more particularly, relates to health monitoring and remaining component life for hydraulic accumulators.

BACKGROUND

Many heavy equipment machines, such as those used in the construction, agriculture, earth-moving, oil extraction, and mining industries, include hydraulic circuits that utilize hydraulic accumulators. For example, such heavy equipment machines can include implements that are operated through the use of hydraulic cylinders or actuators and hydraulic accumulators. The continuous use of the hydraulic accumulators during operation of the heavy equipment machine can cause wear over time. It is desirable to detect the health of the hydraulic accumulator in order to schedule maintenance and plan for machine inoperability.

Some prior techniques required physically connecting a pressure gauge to a gas valve of the hydraulic accumulator, when the heavy equipment machine is stopped and the fluid in the hydraulic accumulator is not pressurized, in order to detect the health of the hydraulic accumulator. While effective, this technique presented challenges when the hydraulic accumulator was positioned in a location that was difficult to access.

In efforts to reduce down time of the heavy equipment machines during health detection, some more current techniques collect data from hydraulic devices while in the field. For example, U.S. Pat. No. 7,120,523 ('523 patent) discloses the utilization of operating parameters of hydraulic cylinders for predicting service intervals. While the '523 patent monitors piston travel distance, pressure and temperature of the working fluid, the monitoring of additional parameters of the hydraulic cylinders can provide more accurate and real-time measurements. Accordingly, improvements in the monitoring of hydraulic accumulator health, performance, and remaining useful life continue to be sought.

SUMMARY

In accordance with an aspect of the disclosure, a system for monitoring a hydraulic accumulator is provided. The hydraulic accumulator includes a first chamber and a second chamber. A piston is movably disposed in the hydraulic accumulator and separates the first chamber from the second chamber. At least one seal encompasses the piston. A first pressure sensor is disposed in the first chamber and is configured to monitor pressure of a first fluid in the first chamber. A second pressure sensor disposed in the second chamber and is configured to monitor pressure of a second fluid in the second chamber. A first temperature sensor is disposed in the first chamber and is configured to monitor the temperature of the first fluid. A second temperature sensor is disposed in the second chamber and is configured to monitor the temperature of the second fluid. An electronic control unit including an algorithm is in communication with the first pressure sensor, the second pressure sensor, the first temperature sensor and the second temperature sensor. The algorithm of the electronic control unit programmed to: responsive to receiving pressure signals from the first and the second pressure sensors and temperature signals from the first and second temperature sensors, determine a wear volume of the at least one seal; and compare the wear volume of the at least one seal to a predetermined threshold wear volume of the at least one seal to determine the remaining useful life of the hydraulic accumulator.

In accordance with another aspect of the disclosure, a system for wirelessly communicating health and remaining useful life of a hydraulic accumulator is provided. The system includes a machine including a hydraulic system. A hydraulic circuit is operatively coupled to the hydraulic system. A hydraulic accumulator is fluidly coupled to the hydraulic circuit. A piston is movably disposed in the hydraulic accumulator. At least one seal encompasses the piston. An electronic control unit including an algorithm is in communication with the hydraulic circuit and the hydraulic accumulator. The algorithm of the electronic control unit programmed to: determine the remaining useful life of the hydraulic accumulator based on comparing a wear volume of the at least one seal to a predetermined threshold wear volume of the at least one seal; and responsive to determining the remaining useful life of the hydraulic accumulator, wirelessly transmit the remaining useful life of the hydraulic accumulator.

In accordance with yet another aspect of the disclosure, a method for monitoring health and remaining useful life of a hydraulic accumulator is provided. The method includes monitoring pressure of a first fluid disposed in the hydraulic accumulator, a pressure of a second fluid disposed in the hydraulic accumulator, temperature of the first fluid disposed in the hydraulic accumulator and temperature of the second fluid disposed in the hydraulic accumulator. The method further includes determining a wear volume of at least one seal encompassing a piston of the hydraulic accumulator calculated from the pressure of the first and the second fluids and the temperature of the first and second fluids. Additionally, the method includes comparing the wear volume of the at least one seal to a predetermined threshold wear volume of the at least one seal to determine the remaining useful life of the hydraulic accumulator; comparing the remaining useful life of the hydraulic accumulator with a predetermined remaining useful life threshold; and displaying an alert responsive to determining the remaining useful life of the hydraulic accumulator is less than the predetermined remaining useful life threshold.

These and other aspects and features of the present disclosure will be more readily understood upon reading the following detailed description when taken in conjunction with the accompanying drawings. Aspects of different embodiments herein described can be combined with or substituted by one another.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
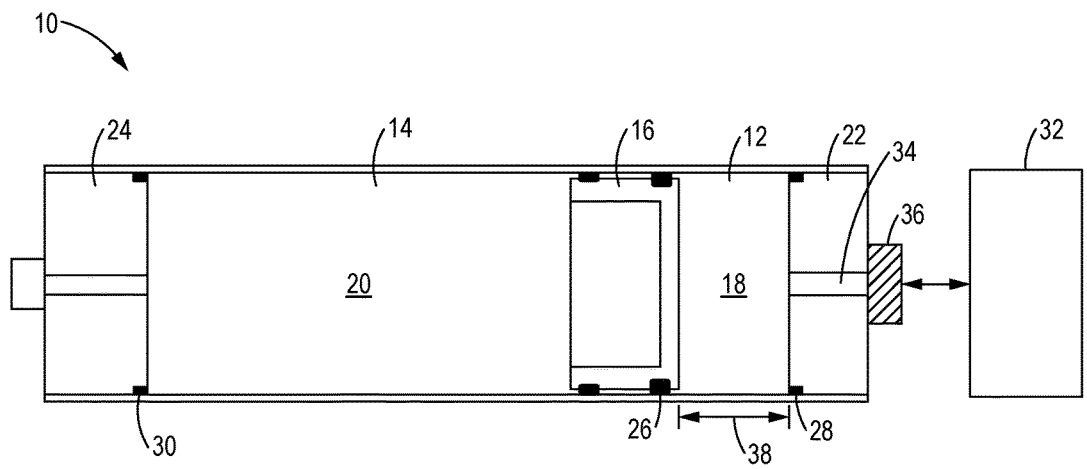
FIG. 1 is a diagrammatic, cross-sectional view of an hydraulic accumulator, in accordance with an embodiment of the present disclosure.

Referring now to FIG. 1, an exemplary hydraulic accumulator constructed in accordance with the present disclosure is generally referred to by reference numeral 10. The hydraulic accumulator 10 includes a first chamber 12 and second chamber 14 separated by a piston 16. The first chamber 12 is configured to receive a first fluid 18. The first fluid 18 may be, but is not limited to, hydraulic fluid, lubricating fluid, transmission fluid, or any other fluid associated with hydraulic machinery. The second chamber 14 is configured to contain a second fluid 20. The second fluid 20 may be, but is not limited to, a gas or any other compressible fluid such as, for example, nitrogen. The piston 16 separates the first chamber 12 from the second chamber 14 such that the first fluid 18 and the second fluid 20 are substantially isolated from each other.

The hydraulic accumulator 10 includes a first end cap 22 disposed adjacent the first chamber 12 such that the first fluid 18 is maintained between the first end cap 22 and the piston 16. The hydraulic accumulator 10 also includes a second end cap 24 disposed adjacent the second chamber 14 such that the second fluid 20 is maintained between the second end cap 24 and the piston 16. The piston 16 is movable within the hydraulic accumulator 10 to reduce the volume of the second chamber 14 and increase the volume of the first chamber 12 as the piston 16 moves away from the first end cap 22 and towards the second end cap 24. In a similar manner, when the piston 16 moves away from the second end cap 24 and towards the first end cap 22 within the hydraulic accumulator 10, the volume of the second chamber 14 increases and the volume of the first chamber 12 decreases. The piston 16 includes at least one seal 26 to prevent the first fluid 18 from entering into the second chamber 14 and prevent the second fluid 20 from entering into the first chamber 12. The at least one seal 26 encompasses the piston 16. The first end cap 22 includes at least one first cap seal 28 and the second end cap 24 includes at least one second cap seal 30.

In one non-limiting example, the first chamber 12 of the hydraulic accumulator 10 is fluidly coupled to a hydraulic circuit 32 via a port 34, which is disposed through the first end cap 22, and a valve 36, which is disposed on the first end cap 22 and fluidly coupled to the port 34. The hydraulic circuit 32 may include hydraulic components (not shown) which are well known in the industry such as, but not limited to, one or more control valves, one or more hydraulic actuators, at least one pump fluidly coupled to a hydraulic fluid reservoir and any other such components consistent with a hydraulic circuit.

The hydraulic circuit 32 may be configured to pump or otherwise transport the first fluid 18 from the hydraulic circuit 32 into the first chamber 12 of the hydraulic accumulator 10 via the port 34. In some embodiments, the valve 36 is configured as a two-position, one-way valve including an open position and a closed position. When the valve 36 is selectively moved to the closed position, the valve 36 is capable of isolating the first fluid 18 from the hydraulic circuit 32 and retaining the first fluid 18 within the first chamber 12 of the hydraulic accumulator 10. On the other hand, when the valve 36 is selectively moved to the open position, the first fluid 18 within the first chamber of the hydraulic accumulator is in fluid communication with the hydraulic circuit 32, which is fluidly coupled to the valve 36. As a result, during operation the first fluid 18 level within the first chamber 12 and/or the second fluid 20 within the second chamber 14 may each be increased or decreased to define an operational travel range 38 of the piston 16. As used herein, the operational travel range 38 refers to the desired travel displacement of the piston 16 during operation of the hydraulic accumulator 10.

Figure 2:
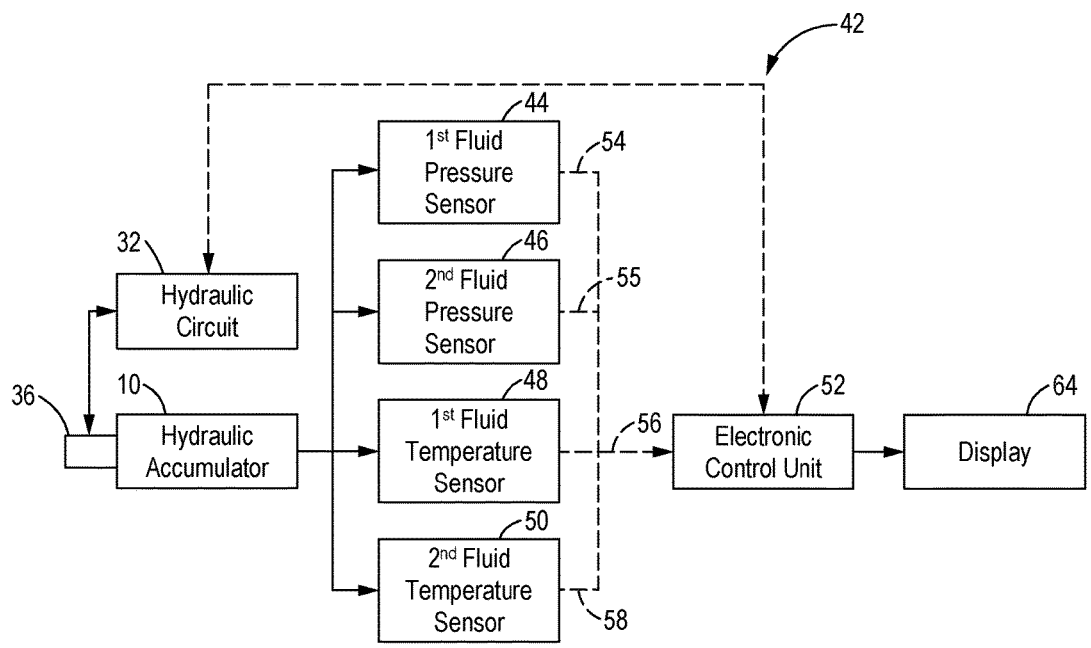
FIG. 2 is a block diagram of an exemplary system for monitoring health and remaining life of an hydraulic accumulator, in accordance with an embodiment of the present disclosure.

FIG. 2 illustrates one non limiting example of a system 42 capable of monitoring the health and remaining useful life of the hydraulic accumulator 10. The hydraulic accumulator 10 is in communication with a first fluid pressure sensor 44, a second fluid pressure sensor 46, a first fluid temperature sensor 48, and a second fluid temperature sensor 50. In some embodiments, the first fluid pressure sensor 44 is disposed in the first chamber 12 of the hydraulic accumulator 10 and is configured to monitor and measure the pressure of the first fluid 18 in the first chamber 12, and the second fluid pressure sensor 46 is disposed in the second chamber 14 of the hydraulic accumulator 10 and is configured to monitor and measure the pressure of the second fluid 20 in the second chamber 14. Furthermore, the first fluid temperature sensor 48 may also be disposed in the first chamber 12 and is configured to monitor and measure the temperature of the first fluid 18, and the second fluid temperature sensor 50 is disposed in the second chamber 14 and is configured to monitor and measure the temperature of the second fluid 20. Alternatively, an embodiment of the hydraulic accumulator 10 may include only the first fluid temperature sensor 48 disposed in the first chamber 12 to monitor and measure the temperature of the first fluid 18. Likewise, another embodiment of the hydraulic accumulator 10 may include only the second fluid temperature sensor 50 disposed in the second chamber 14 to monitor and measure the temperature of the second fluid 20.

Furthermore, the first fluid pressure sensor 44, the second fluid pressure sensor 46, the first fluid temperature sensor 48, and the second fluid temperature sensor 50 are all in communication with an electronic control unit 52. The electronic control unit 52 is configured to receive and process a first pressure signal 54 and a second pressure signal 55 from the first fluid pressure sensor 44 and the second fluid pressure sensor 46, respectively. Additionally, the electronic control unit 52 is configured to receive and process a first temperature signal 56 and a second temperature signal 58 from the first fluid temperature sensor 48 and second fluid temperature sensor 50, respectively. The monitoring system 42 is a dynamic system such that the electronic control unit 52 is configured to monitor current status, operation, performance, health, and remaining useful life of the hydraulic accumulator 10 via, in part, dynamic, real-time feedback of the pressure signals 54, 55 and the temperature signals 56 58. The electronic control unit 52 of the monitoring system 42 is configured to, in response to receiving and processing the first and second pressure signals 54, 55 and the first and second temperature signals 56, 58, determine the health and remaining useful life of the hydraulic accumulator 10. As discussed in more detail below, in an embodiment, an algorithm inside the electronic control unit 52 is programmed to collect, store, analyze and perform other such functions on the data collected in order to help monitor the overall health and remaining useful life of the hydraulic accumulator 10.

In particular, the electronic control unit 52 is configured to calculate the wear volume W of the at least one seal 26, which is a factor in measuring and determining the life of the hydraulic accumulator 10. The wear volume W is a function of the temperature T of the first fluid 18, the differential pressure ΔP, and the travel distance ΔX and is expressed as:

$$W = f(T, \Delta P, \Delta X), \text{ where } \Delta P = |P_{oil} - P_{gas}| \quad (1)$$

(e.g., the differential pressure of the first fluid 18 ($P_{oil}$) and the second fluid 20 ($P_{gas}$), which is also referred to as the normal pressure). In some embodiments, the electronic control unit 52 calculates the travel distance ΔX by processing the pressure signals 54, 55 received from the first fluid pressure sensor 44 and the second fluid pressure sensor 46 to calculate the first fluid 18 volume inside the first chamber 12 and, in turn, convert to the travel displacement of the piston 16 and the at least one seal 26 at the particular pressure. However, in alternative embodiments a distance sensor (not shown) may be incorporated with the hydraulic accumulator 10 to measure a distance traveled by the piston 16 and/or seal 26 and the electronic control unit 52 can calculate the travel distance ΔX based on distance signal generated by the distance sensor.

Moreover, a predetermined threshold wear volume $W_{PT}$ of the at least one seal 26 of the hydraulic accumulator 10 is calculated during a hydraulic accumulator validation test and is stored in the electronic control unit 52. The predetermined threshold wear volume $W_{PT}$ is calculated via the equation as follows:

$$W_{PT} = \Sigma(C_{T\_test} * |P_{gas\_test} - P_{oil\_test}| * |D_i - D_{i-1}|), \quad (2)$$

where $C_{T\_test}$ is the variant contributing to the wear of the at least one seal 26 due to the temperature during the validation test.

During operation of the hydraulic accumulator 10 in the field, the electronic control unit 52 of the monitoring system 42 monitors and receives in real-time the pressure signals 54, 55 and the temperature signals 56, 58 to calculate the wear volume $W_{RT}$ of the at least one seal 26 of the hydraulic accumulator 10. The electronic control unit 52 calculates the wear volume $W_{RT}$ via the following equation:

$$W_{RT} = \Sigma(C_{T\_RT} * |P_{gas\_RT} - P_{oil\_RT}| * |X_i - X_{i-1}|), \quad (3)$$

where $C_{T\_RT}$ is the variant contributing to the wear of the at least one seal 26 due to the real-time temperature in the field.

With the predetermined threshold travel distance $X_{PT}$ and the real-time travel distance $X_{RT}$ of the piston 16 and the at least one seal 26 continuously summed, the algorithm inside the electronic control unit 52 compares the wear volume $W_{RT}$ to the predetermined threshold wear volume $W_{PT}$ for calculating the remaining useful life (RUL) of the hydraulic accumulator 10 via the following equation:

$$RUL = (W_{PT} - W_{RT}) / W_{PT} \quad (4)$$

When the hydraulic accumulator validation test represents the real-time, in field operation truly, the temperature variants $C_{T\_test}$ and $C_{T-RT}$ can be assumed to be the same, hence the following equation:

$$RUL = (\Sigma(|P_{gas\_RT} - P_{oil\_RT}| * |X_i - X_{i-1}|)) / (\Sigma(|P_{gas\_test} - P_{oil\_test}| * |D_i - D_{i-1}|)) \quad (5)$$

Figure 3:
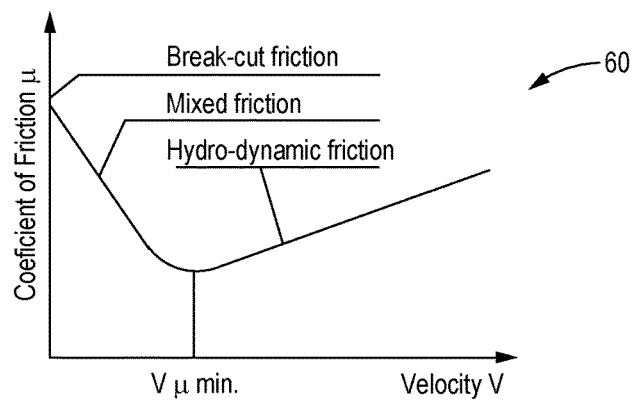
FIG. 3 is a graphical representation of a theoretical Stribeck diagram.
Figure 4:
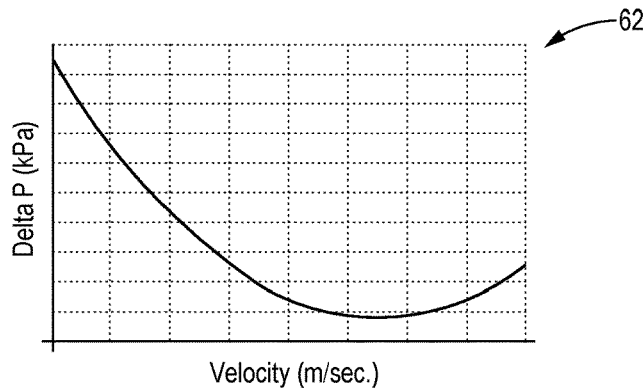
FIG. 4 is a graphical representation of an empirical Stribeck diagram, in accordance with an embodiment of the present disclosure.

Additionally or alternatively, in some embodiments, the electronic control unit 52 of the monitoring system 42 processes and incorporates the results of the at least one seal 26 Stribeck diagram. In some embodiments, the Stribeck diagram of the at least one seal 26 may take into account that the normal pressure and force to the at least one seal 26 will not be the same with different seal velocities. A theoretical Stribeck diagram 60 is illustrated in FIG. 3 to show the relationship for the friction coefficient versus velocity. With the ΔP determined, the electronic control unit 52 of the monitoring system 42 is programmed or otherwise configured to process an empirical Stribeck diagram 62, i.e., the relationship for the ΔP versus velocity, which is exemplarily illustrated in FIG. 4, to determine the seal nominal force at any given piston travel velocity. This result is another manner to calculate wear volume $W_{SD}$ for the at least one seal 26. As such, the electronic control unit 52 is configured to process this $W_{SD}$ and compare it the predetermined threshold wear volume $W_{PT}$ or the wear volume $W_{RT}$ to determine the remaining useful life RUL of the hydraulic accumulator 10.

Further, the algorithm inside the electronic control unit 52 is programmed or otherwise configured to compare a predetermined remaining useful life threshold $RUL_{threshold}$ value stored on the electronic control unit 52 with the calculated remaining useful life RUL in order to monitor the health of the hydraulic accumulator 10. The electronic control unit 52 is configured to display the calculated remaining useful life RUL, via a display 64 (shown in FIG. 2); in a manner that visually contrasts it with the predetermined remaining useful life threshold $RUL_{threshold}$ value. The electronic control unit 52 is further configured to, responsive to determining that the remaining useful life RUL is less than the predetermined remaining useful life threshold $RUL_{threshold}$, output an alert or notification indicating that the hydraulic accumulator 10 requires maintenance. Additionally, with the electronic control unit 52 in communication with the hydraulic circuit 32, the electronic control unit 52 is programmed or otherwise configured to, responsive to determining that the hydraulic circuit 32 requires shut down to prevent any negative effects, shut down the hydraulic circuit 32.

Figure 5:
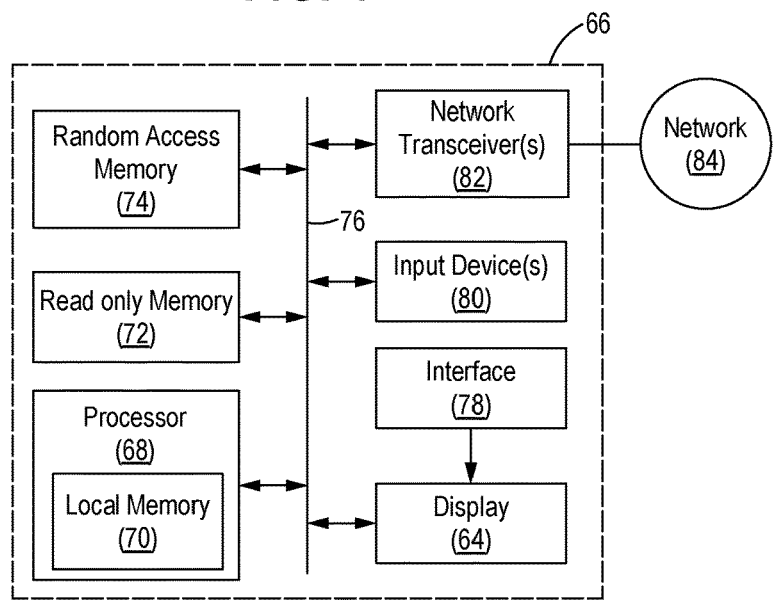
FIG. 5 is block diagram illustrating components of an exemplary electronic control unit, in accordance with an embodiment of the present disclosure.

FIG. 5 is a block diagram of example components of an exemplary computing device 66, such as the electronic control unit 52, capable of executing instructions to realize the disclosed system and methods for monitoring health and remaining life of the hydraulic accumulator 10, as described below and/or capable of executing instructions to perform methods below in reference to FIG. 7. The computing device 66 includes a processor 68 that may be, for example, implemented by one or more microprocessors or controllers from any desired family or manufacturer.

The processor 68 includes a local memory 70 and is in communication with a main memory including a read-only memory 72 and a random access memory 74 via a bus 76. The random access memory 74 may be implemented by Synchronous Dynamic Random Access Memory (SDRAM), Dynamic Random Access Memory (DRAM), RAMBUS Dynamic Random Access Memory (RDRAM) and/or any other type of random access memory device. The read-only memory 72 may be implemented by a hard drive, flash memory and/or any other desired type of memory device.

The computing device 66 may also include an interface circuit 78. The interface circuit 78 may be implemented by any type of interface standard, such as, for example, an Ethernet interface, a universal serial bus (USB), and/or a PCI express interface. One or more input devices 80 are connected to the interface circuit 78 via the bus 76. The input device(s) 80 permit an operator to enter data and commands into the processor 68. The input device(s) 80 may be implemented by, for example, a joystick, a keyboard, a keypad, a touch screen, a mouse, a track-pad, a trackball, and/or a voice recognition system. For example, the input device(s) 80 may include any wired or wireless device for providing input.

A visual display, such as display 64, is also connected to the interface circuit 78 via the bus 76. The display 64 may be implemented by, for example, one or more display devices for associated data (e.g., a liquid crystal display, a cathode ray tube display (CRT), etc.).

Further, the computing device 66 may include one or more network transceivers 82 for connecting to a network 84, such as the Internet, a WLAN, a LAN, a personal network a satellite network, or any other network for connecting the computing device 66 to one or more other computers or network capable devices. As such, the computing device 66 may be utilized to notify or alert other computing devices of the remaining useful life of the hydraulic accumulator 10.

In some embodiments, the computing device 66 is used to execute machine readable instructions. For example, the computing device 66 may execute machine readable instructions to perform the sample sequence illustrated in flowchart 700 in FIG. 7. In such examples, the machine readable instructions comprise a program for execution by the processor 68. The program may be embodied in software stored on a tangible computer readable medium such as a CD-ROM, a floppy disk, a hard drive, a digital versatile disk (DVD), a Blu-Ray™ disk, or a memory associated with the processor 68, but the entire program and/or parts thereof could alternatively be executed by a device other than the processor 68 and/or embodied in firmware or dedicated hardware. Further, although the example programs are described with reference to the flowchart 700 illustrated in FIG. 7, many other methods of implementing embodiments of the present disclosure may alternatively be used. For example, the order of execution of the blocks may be changed, and/or some of the blocks described may be changed, eliminated, or combined.

Figure 6:
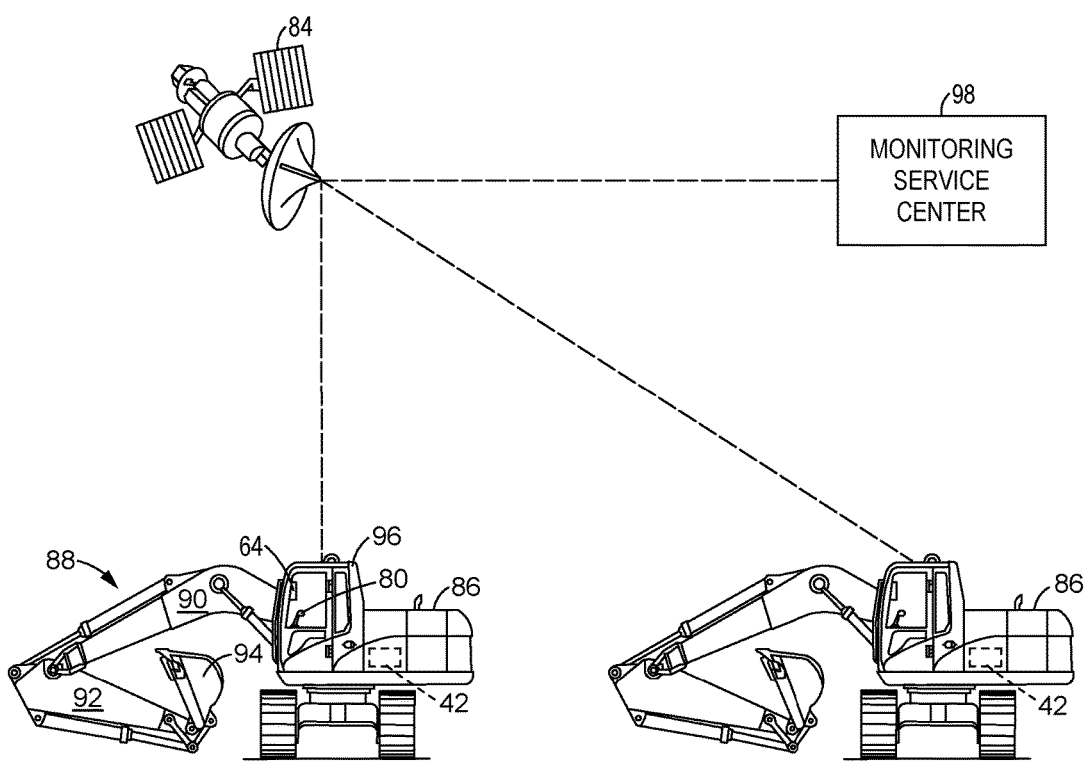
FIG. 6 is schematic diagram illustrating an exemplary system for communicating amongst a fleet of machines and a monitoring service center, in accordance with an embodiment of the present disclosure.

Furthermore, in the exemplary embodiment illustrated in FIG. 6, with continued reference to FIGS. 1 and 2, the hydraulic accumulator 10 and the monitoring system 42 are utilized with the hydraulic circuit 32 of a machine 86. Although the machine 86 is exemplarily depicted as an excavator, it is to be understood that the machine 86 may be any type of machine in the construction, agriculture, earth-moving, oil extraction, and mining industries such as, but not limited to wheel loaders, front shovels, backhoes, track-type tractors, dozers, motor graders, drill stations, or other types of mobile or stationary machines well known in the industries. The machine 86 includes a hydraulic system 88, which is operatively coupled to the hydraulic circuit 32. In particular, the hydraulic circuit 32 is utilized to move various components of the hydraulic system 88, such as, but not limited to, the boom 90, the stick 92, and the implement 94, via control of the input device 80, exemplarily illustrated as a joystick.

With the display 64 disposed in the cab 96 of the machine 86, the electronic control unit 52 displays the calculated remaining useful life RUL in a manner that visually contrasts it with the predetermined remaining useful life threshold $RUL_{threshold}$ value. In addition, responsive to determining that the remaining useful life RUL is less than the predetermined remaining useful life threshold $RUL_{threshold}$, the electronic control unit 52 outputs the alert or notification to the display 64 indicating that the hydraulic circuit 32 requires maintenance. Moreover, responsive to determining that the hydraulic circuit 32 requires shut down to prevent any negative effects, the electronic control unit 52 is configured to shut down the hydraulic circuit 32. In addition to alerting and notifying an operator in the cab 96, the monitoring system 42 is configured to wirelessly transmit, via the network 84, alerts and notifications to other machines within a fleet of machines at a worksite or otherwise, to a monitoring service center 98, and to any other computing device.

INDUSTRIAL APPLICABILITY

In general, the present disclosure may find applicability with monitoring systems for hydraulic accumulators utilized in machines for construction, agriculture, earth-moving, oil extraction, and mining industries. By utilizing the systems and methods disclosed herein, the monitoring system 42 monitors the current status, operation, and performance of the at least one seal 26 of the hydraulic accumulator 10 via, in part, dynamic, real-time feedback of the pressure signals 54, 55 and the temperature signals 56, 58 to determine and display the health and remaining useful life of the hydraulic accumulator 10. As a result, the electronic control unit 52 of the monitoring system 42 can output alerts and/or shut down the hydraulic circuit 32 to prevent any negative effects on the hydraulic circuit 32 and/or other components of the machine 86. Moreover, the electronic control unit 52 of the monitoring system 42 can transmit, via the network 84, the dynamic, real-time feedback to other machines within the fleet or to a monitoring service center 98, as well as, transmit alerts and notifications related to the hydraulic accumulator 10.

In operation, the electronic control unit 52 monitors the dynamic, real-time health and performance of the at least one seal 26 via the first and second pressure signals 54, 55 received from first fluid pressure sensor 44 and the second fluid pressure sensor 46, the first and second temperature signals 56, 58 received from the first fluid temperature sensor 48, and the second fluid temperature sensor 50. In particular, responsive to receiving the signals 54, 55, 56, 58, the electronic control unit 52 calculates the wear volume $W_{RT}$ of the at least one seal 26 of the hydraulic accumulator 10. With the wear volume $W_{RT}$ calculated, the electronic control unit 52 determines the remaining useful life RUL of the hydraulic accumulator 10 by comparing the wear volume $W_{RT}$ with the predetermined threshold wear volume $W_{PT}$ that is stored in the electronic control unit 52.

The electronic control unit 52 then outputs the remaining useful life RUL to the display 64 in such a manner that visually contrasts it with the predetermined remaining useful life threshold $RUL_{threshold}$ value stored on the electronic control unit 52. Moreover, the electronic control unit 52 also can output for display, via the network 84, the remaining useful life RUL in a similar manner to other machines within the fleet or to the monitoring service center 98. Further, the electronic control unit 52 compares the remaining useful life RUL to the predetermined remaining useful life threshold $RUL_{threshold}$ value to determine whether the remaining useful life RUL is less than the predetermined useful life threshold $RUL_{threshold}$. If the electronic control unit 52 determines this is true, then it outputs an alert or notification indicating that the hydraulic accumulator 10 requires maintenance. The alert or notification can be output to the display 64, another machine in the fleet, and/or to the monitoring service center 98.

Figure 7:
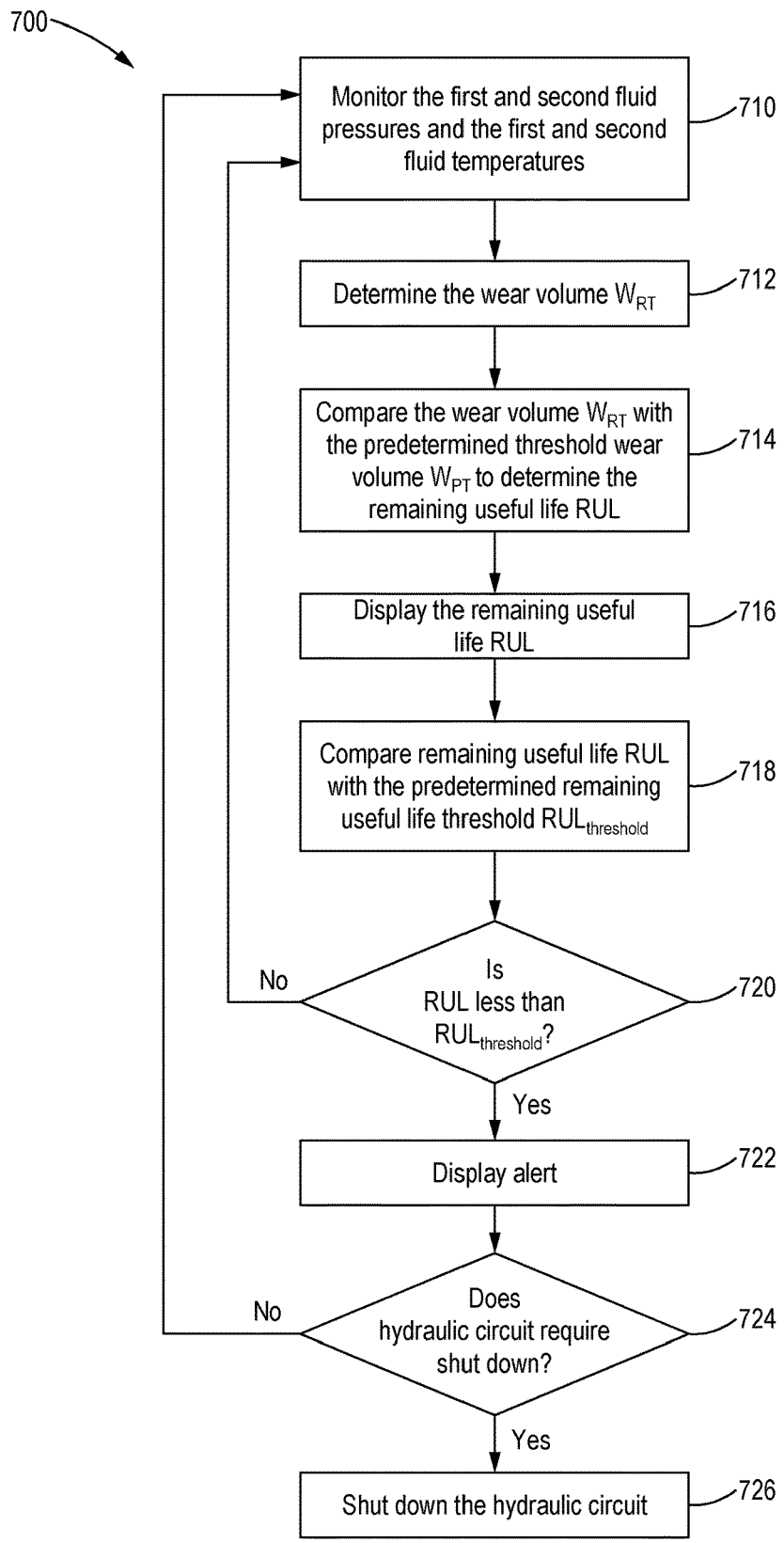
FIG. 7 is a flow chart illustrating a sample sequence which may be practiced in accordance with the teachings of the present disclosure.

FIG. 7 illustrates a block diagram 700 of a sample sequence which may be performed to monitor the health and remaining useful life of a hydraulic accumulator. As illustrated in block 710, the electronic control unit 52 of the monitoring system 42 monitors and measures the pressure of the first fluid 18 in the first chamber 12 via the first fluid pressure sensor 44, the pressure of the second fluid 20 in the second chamber 14 via the second fluid pressure sensor 46, the temperature of the first fluid 18 in the first chamber 12 via the first fluid temperature sensor 48, and the temperature of the second fluid 20 in the second chamber 14 via the second fluid temperature sensor 50. The electronic control unit 52 then determines the wear volume $W_{RT}$, as depicted in block 712. Moving to block 714, the electronic control unit 52 compares the wear volume $W_{RT}$ with the predetermined threshold wear volume $W_{PT}$ to determine the remaining useful life RUL of the hydraulic accumulator 10. As depicted in block 716, the electronic control unit 52 displays the remaining useful life RUL of the hydraulic accumulator 10 on the display 64 and/or similarly to other machines within the fleet or to the monitoring service center 98.

The block 718 depicts the electronic control unit 52 comparing the remaining useful life RUL of the hydraulic accumulator 10 with the predetermined remaining useful life threshold $RUL_{threshold}$ value stored in the electronic control unit 52. As depicted in decision block 720, the electronic control unit 52 determines whether the remaining useful life RUL of the hydraulic accumulator 10 is less than the predetermined remaining useful life threshold $RUL_{threshold}$ value. If the electronic control unit 52 determines that the remaining useful life RUL of the hydraulic accumulator 10 is not less than the predetermined remaining useful life threshold $RUL_{threshold}$ value, then monitoring continues as shown by the return arrow to block 710. On the other hand, as illustrated in block 722, if the remaining useful life RUL of the hydraulic accumulator 10 is less than the predetermined remaining useful life threshold $RUL_{threshold}$ value, then the electronic control unit 52 displays the alert or notification to the display 64 and/or similarly to other machines 86 within the fleet or to the monitoring service center 98.

As depicted in decision block 724, the electronic control unit 52 determines whether the remaining useful life RUL of the hydraulic accumulator 10 is well below the predetermined remaining useful life threshold $RUL_{threshold}$ value to require shut down of the hydraulic circuit 32. If no, then the electronic control unit 52 continues monitoring as depicted by the return arrow to block 710. If yes, the electronic control unit 52, responsive to this determination, shut downs the hydraulic circuit 32, as depicted in block 726.

What is claimed is:

1. A system for monitoring a hydraulic accumulator, the system comprising:
    a hydraulic accumulator including a first chamber and a second chamber;
    a piston movably disposed in the hydraulic accumulator, the piston separating the first chamber from the second chamber;
    at least one piston seal encompassing the piston;
    a first pressure sensor disposed within the first chamber, the first pressure sensor configured to monitor pressure of a first fluid in the first chamber, wherein the first fluid is a non-compressible hydraulic fluid;
    a second pressure sensor disposed within the second chamber, the second pressure sensor configured to monitor pressure of a second fluid in the second chamber, wherein the second fluid is a compressible fluid isolated from the first fluid by the at least one piston seal;
    a first temperature sensor disposed within the first chamber, the first temperature sensor configured to monitor the temperature of the first fluid;
    a second temperature sensor disposed within the second chamber, the second temperature sensor configured to monitor the temperature of the second fluid; and
    an electronic control unit including an algorithm, the electronic control unit in communication with the first pressure sensor, the second pressure sensor, the first temperature sensor and the second temperature sensor, the algorithm of the electronic control unit programmed to:
        responsive to receiving pressure signals from the first and the second pressure sensors and temperature signals from the first and second temperature sensors, determine a wear volume of the at least one piston seal, and
        compare the wear volume of the at least one piston seal to a predetermined threshold wear volume of the at least one piston seal to determine a remaining useful life of the hydraulic accumulator.

2. The system of claim 1, further including a selectively controlled valve operatively coupled to the hydraulic accumulator, wherein when the selectively controlled valve is actuated into a closed position the first fluid is isolated from a hydraulic circuit fluidly coupled to the hydraulic accumulator and the first fluid is retained within the first chamber of the hydraulic accumulator.

3. The system of claim 1, further including a display in communication with the electronic control unit, wherein the electronic control unit is configured to output, to the display, the remaining useful life of the hydraulic accumulator.

4. The system of claim 3, wherein the electronic control unit is further configured to output, to the display, the remaining useful life of the hydraulic accumulator relative to a predetermined remaining useful life threshold value.

5. The system of claim 4, wherein the electronic control unit is further configured to, responsive to determining that the remaining useful life is less than the predetermined remaining useful life threshold value, output an alert to the display indicating the hydraulic accumulator requires maintenance.

6. The system of claim 5, wherein the electronic control unit is further configured to, responsive to determining that the remaining useful life is less than the predetermined remaining useful life threshold value and determining that a hydraulic circuit fluidly coupled to the hydraulic accumulator requires shut down, shut down the hydraulic circuit.

7. A system for wirelessly communicating health and remaining useful life of a hydraulic accumulator, comprising:
    a machine including a hydraulic system;
    a hydraulic circuit operatively coupled to the hydraulic system;
    a hydraulic accumulator fluidly coupled to the hydraulic circuit;
    a piston movably disposed in the hydraulic accumulator, the piston separating a first chamber from a second chamber;

at least one piston seal encompassing the piston;
a first pressure sensor disposed within the first chamber and configured to monitor pressure of a first fluid, wherein the first fluid is a non-compressible hydraulic fluid;
a second pressure sensor disposed within the second chamber and configured to monitor pressure of a second fluid, wherein the second fluid is a compressible fluid isolated from the first fluid by the at least one piston seal;
an electronic control unit including an algorithm, the electronic control unit in communication with the hydraulic circuit and the hydraulic accumulator, the algorithm of the electronic control unit programmed to:
    determine a wear volume of the piston seal based on pressure signals from the first and second pressure sensors proximate the piston seal,
    determine the remaining useful life of the hydraulic accumulator based on comparing the wear volume of the at least one piston seal to a predetermined threshold wear volume of the at least one piston seal, and
    responsive to determining the remaining useful life of the hydraulic accumulator, wirelessly transmit the remaining useful life of the hydraulic accumulator
wherein the electronic control unit is also configured to determine the wear volume responsive to receiving temperature signals from a first temperature sensor configured to monitor temperature of the first fluid and a second temperature sensor disposed in the hydraulic accumulator configured to monitor temperature of the second fluid.

8. The system of claim 7, wherein the electronic control unit is configured to wirelessly transmit the remaining useful life of the hydraulic accumulator to another machine within a fleet of machines.

9. The system of claim 7, wherein the electronic control unit is configured to wirelessly transmit the remaining useful life of the hydraulic accumulator to a monitoring service center for monitoring the health of the hydraulic accumulator.

10. The system of claim 7, further including a selectively controlled valve operatively coupled to the hydraulic accumulator, wherein when the selectively controlled valve is actuated into a closed position the first fluid is isolated from the hydraulic circuit fluidly coupled to the hydraulic accumulator and the first fluid is retained within the first chamber of the hydraulic accumulator.

11. The system of claim 7, wherein the algorithm of the electronic control unit is further programmed to, responsive to determining that the remaining useful life is less than a predetermined remaining useful life threshold value, wirelessly transmit an alert to one of another machine within a fleet of machines and a monitoring service center.

12. The system of claim 11, wherein the electronic control unit is further configured to, responsive to determining that a hydraulic circuit fluidly coupled to the hydraulic accumulator requires shut down based on the determination that the remaining useful life is less than the predetermined remaining useful life threshold value, shut down the hydraulic circuit.

13. A method for monitoring health and remaining useful life of a hydraulic accumulator, the method comprising:
    monitoring a pressure of a first fluid disposed within the hydraulic accumulator and a pressure of a second fluid disposed within the hydraulic accumulator, wherein the first fluid is a non-compressible hydraulic fluid and the second fluid is a compressible fluid;
    monitoring a temperature of the first fluid disposed in the hydraulic accumulator and a temperature of the second fluid disposed in the hydraulic accumulator;
    determining a wear volume of at least one piston seal encompassing a piston that isolates the first and second fluids of the hydraulic accumulator calculated from the pressure of the first and the second fluids and the temperature of the first and second fluids;
    comparing the wear volume of the at least one piston seal to a predetermined threshold wear volume of the at least one piston seal to determine the remaining useful life of the hydraulic accumulator;
    comparing the remaining useful life of the hydraulic accumulator with a predetermined remaining useful life threshold; and
    displaying an alert responsive to determining the remaining useful life of the hydraulic accumulator is less than the predetermined remaining useful life threshold.

14. The method of claim 13, further including transmitting the remaining useful life of the hydraulic accumulator to one of a display disposed on a machine, another machine within a fleet of machines, and a monitoring service center.

15. The method of claim 13, further including determining a travel distance of the piston and the at least one piston seal.

16. The method of claim 14, wherein determining the wear volume of at least one piston seal is further calculated from a determined travel distance of the piston and the at least one piston seal.

17. The method of claim 13, further including determining that a hydraulic circuit fluidly coupled to the hydraulic accumulator requires shut down based on a determination that the remaining useful life is less than the predetermined remaining useful life threshold value.

18. The method of claim 17, further including shutting down the hydraulic circuit.

* * * * *